Dec. 8, 1931.  H. H. HICKS ET AL  1,835,567

BUMPER

Filed July 30, 1927

Inventors
Harlie H. Hicks
& Harry E. Figgie
By
Blackmore, Spencer & Hulse
Attorneys Patented Dec. 8, 1931

1,835,567

UNITED STATES PATENT OFFICE

HARLIE H. HICKS, OF DETROIT, MICHIGAN, AND HARRY E. FIGGIE, OF CORAOPOLIS, PENNSYLVANIA, ASSIGNORS TO GENERAL MOTORS CORPORATION, OF DETROIT, MICHIGAN, A CORPORATION OF DELAWARE

BUMPER

Application filed July 30, 1927. Serial No. 209,621.

This invention relates to a front bumper assembly, and it is an object of the invention to provide a new and improved bumper, which will be light in weight, strong, and better adapted to perform its functions than those heretofore produced.

Another object of the invention is to provide, in a bumper of the type which includes front and rear bars, an improved connection between the front and rear bars which will eliminate rattling and excessive vibration of the bars, particularly at high vehicular speeds.

Another object is to provide an improved means for connecting a bumper to the vehicle on which it is to be used.

Another object is to provide an improved bumper bar.

Other objects will be obvious from a perusal of the following specification, taken in connection with the accompanying drawings, in which.

Figure 1:
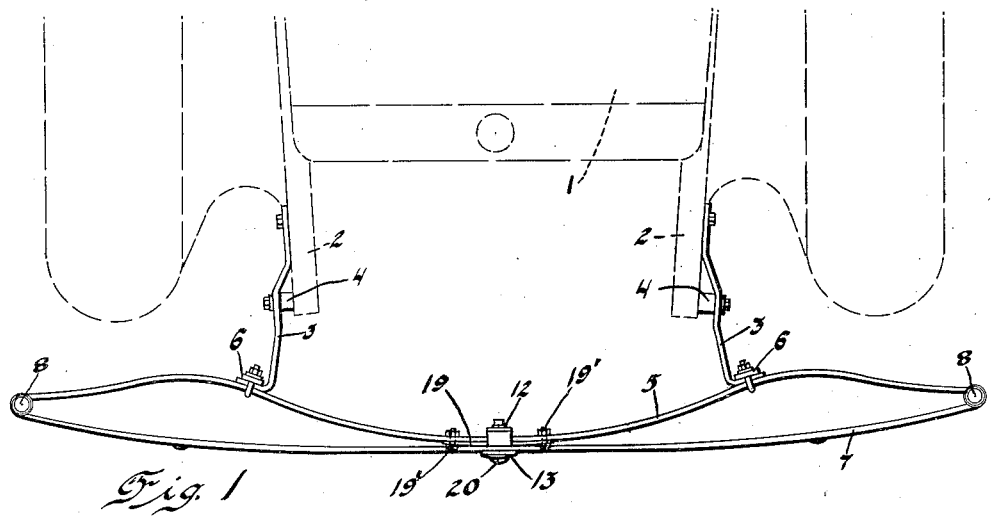
Figure 1 is a plan view of the front end of an automobile showing our improved bumper in place thereon.

In the drawings, the reference character 1 indicates the front end of an automobile which is provided with the usual frame members 2.

To the forward end of each of the frame members 2, a bracket 3, which extends forwardly beyond the extremities of the frame members, is attached. The rear end of each bracket abuts against its respective frame member and is secured thereto by appropriate means. Intermediate its ends, each bracket 3 is bent outwardly so that its intermediate portion is spaced outwardly from the forward end of its respective frame member, in order to prevent it from interfering with the fender apron, and is maintained in this position by means of the spacer 4 interposed between it and the frame member. The intermediate portion of each bracket is secured to the forward end of its respective frame member by means extending through the bracket, the spacer and the frame member.

The forward end of each bracket is bent at an angle to the main body portion thereof, as shown in Figure 1. The rear bar 5 of the bumper is secured to the angularly bent portion of both brackets, as indicated at 6.

From its connections with the bracket 3, the rear bumper bar extends outwardly, first slightly rearwardly, and then forwardly, and inwardly and bowed forwardly. To the outer ends of the rear bumper bar the front bumper bars 7 are connected by bolts 8, one front bumper bar being above and the other below the rear bumper bar. The front bumper bars are bowed forwardly from their connections with the rear bumper bar and at their centers are spaced only slightly forwardly thereof.

Figure 3:
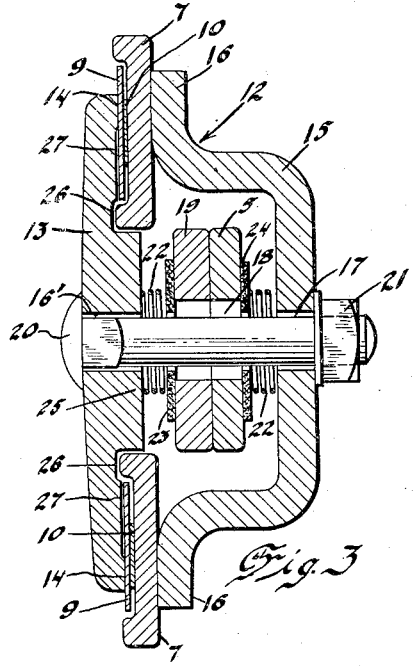
Figure 3 is a section on the line 3—3 of Figure 2.

The front bumper bars are channel-shaped in cross section, as shown in Figure 3. Inlaid in the channel of each bar is a metallic ornamental strip 9, which rests, for substantially its entire length, on a narrower resilient strip 10. The strips 9 and 10 are secured to the bar by appropriate means, such as rivets 11. The resilient strip, being of less width than the ornamental strip, is entirely concealed thereby, and prevents rattling of the ornamental strip against the bumper bar.

In order to prevent excessive vibration of the bumper bars and to keep them separated so that they will not rattle, the means shown generally at 12 has been provided. This means includes an escutcheon plate 13 which is formed with a thickened central portion 25, channels 26 in the upper and lower portions of the rear face, and portions 27, which are raised with respect to the channels 26, but are recessed with respect to the end portions 14. As can be seen from Figure 3, the rear end portions 14 of the escutcheon plate extend into and bear against the webs of the channels of the front bumper bars through the intermediary of the ornamental and resilient strips. Due to the way in which the recesses 26 and 27 are cut out, the front bars are in contact with the escutcheon plate only through the ornamental and resilient strips at the points 14 and thus, by means of the escutcheon plate, the ornamental strips are held firmly against the front bars at their centers and are prevented from rattling. The reference character 15 indicates a channel shaped member, the flanges of which are equipped with outwardly extending flanges 16 bearing against the rear sides of the front bumper bars. As clearly shown in Figure 3, the member 15 straddles the rear bar 5. The escutcheon plate and the member 15 are provided with centrally located, aligned openings 16' and 17, respectively.

Figure 2:
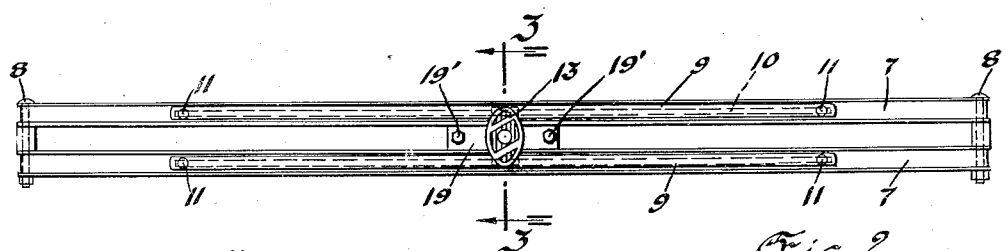
Figure 2 is a front elevation of the bumper shown in Figure 1.

The central portion of the rear bumper bar is provided with an opening 18 aligned with the openings 16' and 17. Because of this opening 18, it has been found desirable to reinforce the central portion of the rear bar with a strip 19 secured to the bar 5 by suitable means, such as the bolts 19' shown in Figures 1 and 2. This strip 19 is provided with a hole of the same size as the hole 18 and aligned therewith.

A bolt 20 extends through the openings in the escutcheon plate 13, the strip 19, the rear bar 5, and the member 15. A nut 21, in conjunction with the bolt 20, secures the parts 13, 7 and 15 together. It is to be noted that the holes through the parts 19 and 5 are considerably larger than the shank of the bolt 20 in order to allow relative movement of the front and rear bumper bars without metallic contact between the bolt and the parts 19 and 5. Coil springs 22, one bearing at one end against the escutcheon plate and at its other end against the resilient washer 23 which bears against the strip 19, the other bearing at one end against the member 15 and at its other end against the resilient washer 24 which bears against the bar 5, surround the bolt 20 and prevent rattling of the bumper bars while allowing relative movement thereof.

From the previous description it will be seen that a new and improved bumper in which the front and rear bars are prevented from excessive vibration and rattling has been provided without rigidly tying the bars together and thus diminishing the resiliency of the bumper.

It will be obvious that our improved bumper is not limited to use on the front of a vehicle but may be used in any desired position.

We claim:

1. A bumper bar, an ornamental strip thereon, and a resilient strip concealed by the ornamental strip.

2. A bumper bar, an ornamental strip thereon, and a resilient strip of less width than the ornamental strip interposed between the bumper bar and the ornamental strip.

3. In a bumper, a bumper bar channel-shaped in cross section, a resilient strip within the channel of the bumper bar, and an ornamental strip of greater width than the resilient strip secured in the channel of the bar.

4. In a bumper, a front bar channel-shaped in cross section, an ornamental strip in the channel of the front bar, a rear bar connected at its ends to the ends of the front bar, and means, including a member having a portion bearing against the ornamental strip and holding it in the channel and preventing it from rattling, intermediate the ends of the bars allowing relative movement thereof but preventing rattling and excessive vibration.

5. In a bumper, vertically spaced front bars, an intermediately positioned rear bar, a plate bearing against the front of the front bars, a member bearing against the rear of the front bars and straddling the rear bar, means extending through the plate, the member, and the rear bar securing the plate and the member to the front bars, and resilient means between the rear bar and the member.

6. In a bumper, vertically spaced front bars, an intermediately positioned rear bar, a plate bearing against the front of the front bars, a member bearing against the rear of the front bars and straddling the rear bar, means extending though the plate, the rear bar, and the member securing said plate and member to the front bars, resilient means between said plate and rear bar, and resilient means between said rear bar and said member.

7. In a bumper, vertically spaced front bars, an intermediately positioned rear bar, a plate bearing against the front of the front bars, a member bearing against the rear of the front bars and straddling the rear bar, means extending through the plate, the rear bar, and the member securing the plate and the member to the front bars, a coiled spring between the plate and the rear bar, and a coiled spring between the rear bar and the member.

8. In a bumper, vertically spaced, channel-shaped front bars, an intermediately positioned rear bar, a plate having portions extending into and bearing against the webs of the channels of the front bars, a member bearing against the rear of the front bars and straddling the rear bar, means extending through the plate, the rear bar, and the member securing the plate and the member to the front bars, a coiled spring between the plate and the rear bar, and a coiled spring between the rear bar and the member.

9. In a bumper, vertically spaced front bars, an intermediately positioned rear bar, a plate bearing against the front of the front bars, a member bearing against the rear of the front bars and straddling the rear bar, the plate and the member having aligned holes therethorugh, the rear bar having a hole therethrough, a reinforcement for the rear bar secured thereto and having a hole therethrough in alignment with the holes through the plate, the member, and the rear bar, means of appreciably less diameter than the holes in the reinforcement and the rear bar extending through the plate, the reinforcement, the rear bar and the member and securing said member and said plate to the front bars, and resilient means between the plate and the rear bar and the rear bar and the member.

10. In a bumper, vertically spaced front bars, an intermediately positioned rear bar, a plate bearing against the front of the front bars, a member bearing against the rear of the front bars and straddling the rear bar, means extending through the plate, the rear bar and the member securing the plate and the member to the front bars, a resilient washer surrounding the means and bearing against the front of the rear bar, a coiled spring surrounding the means and bearing against the washer and the plate, a resilient washer surrounding the means and bearing against the rear of the rear bar, and a coiled spring surrounding the means and bearing against the washer and the member.

11. In a bumper, vertically spaced front bars, an intermediately positioned rear bar, a plate bearing against the front of the front bars, a member bearing against the rear of the front bars and straddling the rear bar, means extending through the plate, the member, and the rear bar securing the plate and the member to the front bars, and resilient means between the rear bar and the plate.

12. In a bumper, vertically spaced channel shaped front bars, an intermediately positioned rear bar, a plate having portions extending into and bearing against the webs of the channels of the front bars, a member bearing against the rear of the front bars and straddling the rear bar, means extending through the plate, the rear bar, and the member securing the plate and the member to the front bars, resilient means between the plate and the rear bar, and resilient means between the rear bar and the member.

13. In a bumper, front and rear bars connected adjacent their ends, and a connection between the front and rear bars intermediate their ends allowing relative movement thereof but preventing rattling and excessive vibration, said connection including a resilient member positioned on the side of one of the bars distant from the other bar.

14. In a bumper, front and rear bars connected adjacent their ends, and a connection between the front and rear bars intermediate their ends allowing relative movement thereof but preventing rattling and excessive vibration, said connection including resilient members positioned on opposite sides of one of said bars.

15. In a bumper, front and rear bars connected adjacent their ends, and a connection between the front and rear bars intermediate their ends allowing relative movement thereof but preventing rattling and excessive vibration, said connection including means fixed with respect to one of the bars and carrying resilient means positioned on opposite sides of the other bar.

16. In a bumper, front and rear bars connected adjacent their ends, and a connection between the front and rear bars intermediate their ends allowing relative movement thereof but preventing rattling and excessive vibration, said connection including a member fixed with respect to one of the bars and extending through the other bar, and resilient means carried by the member on opposite sides of the last-mentioned bar.

17. In a bumper, front and rear bars connected adjacent their ends, one of said bars having adjacent its center an opening therethrough, a connection between the front and rear bars allowing vertical and horizontal movement of the bars with respect to each other, said connection including a member of appreciably smaller diameter than the above mentioned opening fixed with respect to the other of the bars and extending through the opening in the first bar.

18. In a bumper, front and rear bars connected adjacent their ends, one of said bars having adjacent its center a reinforcement and an opening extending through the bar and the reinforcement, a connection between the front and rear bars allowing vertical and horizontal movement of one of the bars with respect to the other, said connection including a member of appreciably smaller diameter than the above-mentioned opening fixed with respect to the other of the bars and extending through the opening in the first bar and the reinforcement.

19. In a bumper, front and rear bars, a connection between the front and rear bars allowing relative movement thereof, said connection including a member secured to one of the bars and straddling the other bar, and resilient means to prevent rattling and excessive vibration of the bars.

20. In a bumper, vertically spaced front bars, an intermediately positioned rear bar, a connection between the front and rear bars allowing relative movement thereof, said connection including a member straddling the rear bar and secured to the front bars, and resilient means to prevent rattling and excessive vibration of the bars.

21. In a bumper, vertically spaced front bars, an intermediately positioned rear bar, a connection between the front and rear bars allowing relative movement thereof, said connection including a plate bearing against the front of the front bars, a member bearing against the rear of the front bars and straddling the rear bar, means securing the plate and the member to the front bars, and resilient means to prevent rattling and excessive vibration of the bars.

22. In a bumper, vertically spaced front bars, an intermediately positioned rear bar, a plate bearing against the front of the front bars, a member bearing against the rear of the front bars and straddling the rear bar, means securing the plate and the member to the front bars, and resilient means between the rear bar and the plate and between the rear bar and the member.

23. In a vehicle, a frame member, a bumper supporting bracket extending longitudinally of the frame member and having an intermediate portion offset laterally with respect to the rear portion of the bracket and spaced farther laterally from the frame member than the rear portion of the bracket, means securing the rear portion of the bracket to the frame member, means between the forward end of the frame member and the intermediate portion of the bracket maintaining the intermediate portion of the bracket spaced from the frame member, and a member extending through the last-mentioned means, the bracket, and the frame member to secure the bracket to the forward end of the frame member.

24. In a bumper, front and rear bars, means to connect the front and rear bars so as to allow relative movement but prevent rattling and excessive vibration thereof, including, securing means, and resilient means on opposite sides of one of the bars.

25. In a bumper, front and rear bars, means to connect the front and rear bars so as to allow relative movement but prevent rattling and excessive vibration thereof, including, resilient means on opposite sides of the rear bar, and securing means extending through the rear bar and the resilient means.

26. In a bumper, an impact member which has vertically spaced portions, a supporting member extending longitudinally thereof, a plate bearing against the outer face of the impact member and contacting with the vertically spaced portions thereof, means to secure the plate to the impact member and to connect the impact member to the supporting member including a bolt which extends through the plate, between the vertically spaced portions of the impact member and loosely through an opening in the supporting member which is considerably larger in diameter than the bolt and a nut on the bolt, and resilient means located between the supporting member and the plate and between the supporting member and the nut, whereby flexure of either member with respect to the other is possible without bending of the bolt and the members are insulated from each other in respect to vibration.

In testimony whereof we affix our signatures.

HARLIE H. HICKS.
HARRY E. FIGGIE.